United States Patent
Yi et al.

(10) Patent No.: US 7,613,473 B2
(45) Date of Patent: Nov. 3, 2009

(54) RRC GROUP REJECT METHOD AND APPARATUS FOR MOBILE COMMUNICATIONS

(75) Inventors: Seung June Yi, Seoul (KR); Young Dae Lee, Kyoungki-do (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 508 days.

(21) Appl. No.: 10/841,337

(22) Filed: May 7, 2004

(65) Prior Publication Data

US 2004/0224709 A1 Nov. 11, 2004

(30) Foreign Application Priority Data

May 9, 2003 (KR) .................. 10-2003-0029468

(51) Int. Cl.
 H04B 7/00 (2006.01)
 H04B 7/24 (2006.01)
(52) U.S. Cl. .................. 455/518; 455/519; 455/39
(58) Field of Classification Search .............. 455/161.1, 455/434, 450, 464, 509, 515, 39, 518, 519, 455/455, 516, 521, 517
 See application file for complete search history.

(56) References Cited

U.S. PATENT DOCUMENTS

| | | | | |
|---|---|---|---|---|
| 5,101,502 A | * | 3/1992 | Felderman et al. | 455/509 |
| 5,235,631 A | * | 8/1993 | Grube et al. | 455/509 |
| 5,809,018 A | * | 9/1998 | Lehmusto | 370/330 |
| 5,970,417 A | * | 10/1999 | Toyryla et al. | 455/519 |
| 6,335,812 B1 | * | 1/2002 | Matsubara et al. | 398/126 |
| 6,741,860 B1 | * | 5/2004 | Einola et al. | 455/450 |
| 6,882,856 B1 | * | 4/2005 | Alterman et al. | 455/519 |
| 6,975,858 B2 | * | 12/2005 | Cao et al. | 455/420 |
| 7,027,811 B2 | * | 4/2006 | Pedlar | 455/425 |
| 7,054,630 B2 | * | 5/2006 | Nagpal et al. | 455/458 |
| 7,089,023 B2 | * | 8/2006 | Vialen et al. | 455/458 |
| 7,239,880 B2 | * | 7/2007 | Shaheen | 455/458 |
| 2002/0110106 A1 | * | 8/2002 | Koo et al. | 370/341 |
| 2002/0147021 A1 | * | 10/2002 | June | 455/452 |
| 2003/0035423 A1 | * | 2/2003 | Beckmann et al. | 370/390 |
| 2003/0147370 A1 | * | 8/2003 | Wu | 370/338 |
| 2004/0032877 A1 | * | 2/2004 | Chuah et al. | 370/444 |
| 2004/0147266 A1 | * | 7/2004 | Hwang et al. | 455/445 |
| 2004/0203778 A1 | * | 10/2004 | Kuo et al. | 455/436 |

FOREIGN PATENT DOCUMENTS

| | | |
|---|---|---|
| JP | 07-321736 | 12/1995 |
| WO | WO 02/065807 A1 | 8/2002 |

\* cited by examiner

*Primary Examiner*—Sonny Trinh
(74) *Attorney, Agent, or Firm*—Lee, Hong, Degerman, Kang & Waimey

(57) ABSTRACT

A method and apparatus for transmitting a single RRC group reject message to reject the RRC connection requests of a plurality of terminals, thus minimizing the waste of radio resources and providing a quick response to those terminals that transmitted a request. A list containing initial UE identities of those terminals to be rejected, and a rejection cause indicating the reason for rejection are included in the single RRC group reject message. Preferably, the list should be generated within a certain time limit to prevent some terminals from re-transmitting their RRC connection requests.

13 Claims, 9 Drawing Sheets

RRC GROUP REJECT METHOD AND APPARATUS FOR MOBILE COMMUNICATIONS

CROSS-REFERENCE TO RELATED APPLICATIONS

Pursuant to 35 U.S.C. § 119(a), this application claims the benefit of earlier filing date and right of priority to Korean Application No. 2003-0029468, filed on May 9, 2003, the contents of which is hereby incorporated by reference herein in its entirety.

BACKGROUND OF THE INVENTION

1. Field of the Invention

The present invention relates to a method and apparatus for facilitating RRC connection between a terminal and UTRAN in a UMTS (Universal Mobile Telecommunication System) and, more particularly, a method and apparatus for facilitating RRC group reject through which the UTRAN may perform RRC connection reject using a single message transmitted to a plurality of terminals.

2. Description of the Related Art

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology.

In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

Figure 1:
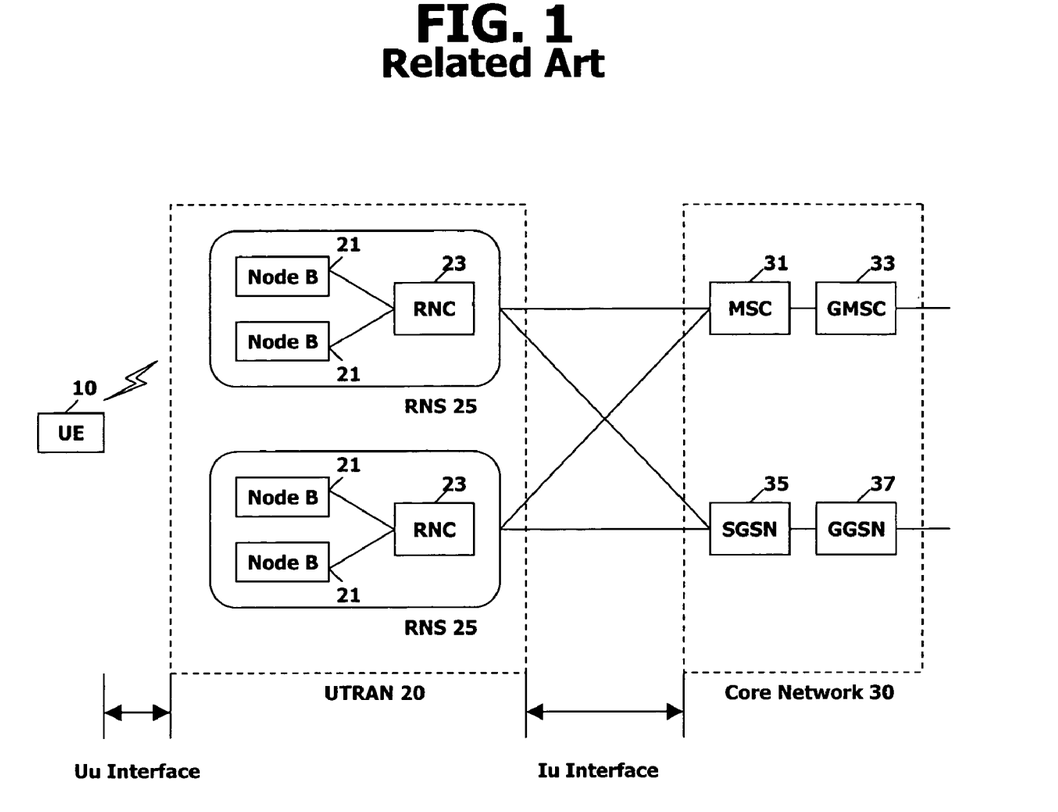
FIG. 1 illustrates a network structure of a general 3GPP UMTS system.

FIG. 1 illustrates an exemplary basic structure of a general UMTS network. As shown in FIG. 1, the UMTS is roughly divided into a terminal or user equipment (UE) 10, a UTRAN 20, and a core network (CN) 30.

The UTRAN 20 includes one or more radio network subsystems (RNS) 25. Each RNS 25 includes a radio network controller (RNC) 23 and a plurality of Node-Bs (base stations) 21 managed by the RNC 23. The RNC 23 handles the assignment and management of radio resources and operates as an access point with respect to the core network 30.

The Node-Bs 21 receive information sent by the physical layer of the terminal 10 through an uplink and transmit data to the terminal 10 through a downlink. The Node-Bs 21 operate as access points of the UTRAN 20 for the terminal 10.

The UTRAN 20 constructs and maintains a radio access bearer (RAB) for communication between the terminal 10 and the core network 30. The core network 30 requests end-to-end quality of service (QoS) requirements from the RAB, and the RAB supports the QoS requirements the core network 30 has set. Accordingly, by constructing and maintaining the RAB, the UTRAN 20 can satisfy the end-to-end QoS requirements.

The services provided to a specific terminal 10 are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 23 are connected to the mobile switching center (MSC) 31 of the core network 30 and the MSC 31 is connected to the gateway mobile switching center (GMSC) 33 that manages the connection with other networks. For supporting packet switched services, the RNCs 23 are connected to the serving general packet radio service (GPRS) support node (SGSN) 35 and the gateway GPRS support node (GGSN) 37 of the core network 30. The SGSN 35 supports the packet communications with the RNCs 23 and the GGSN 37 manages the connection with other packet switched networks, such as the Internet.

Figure 2:
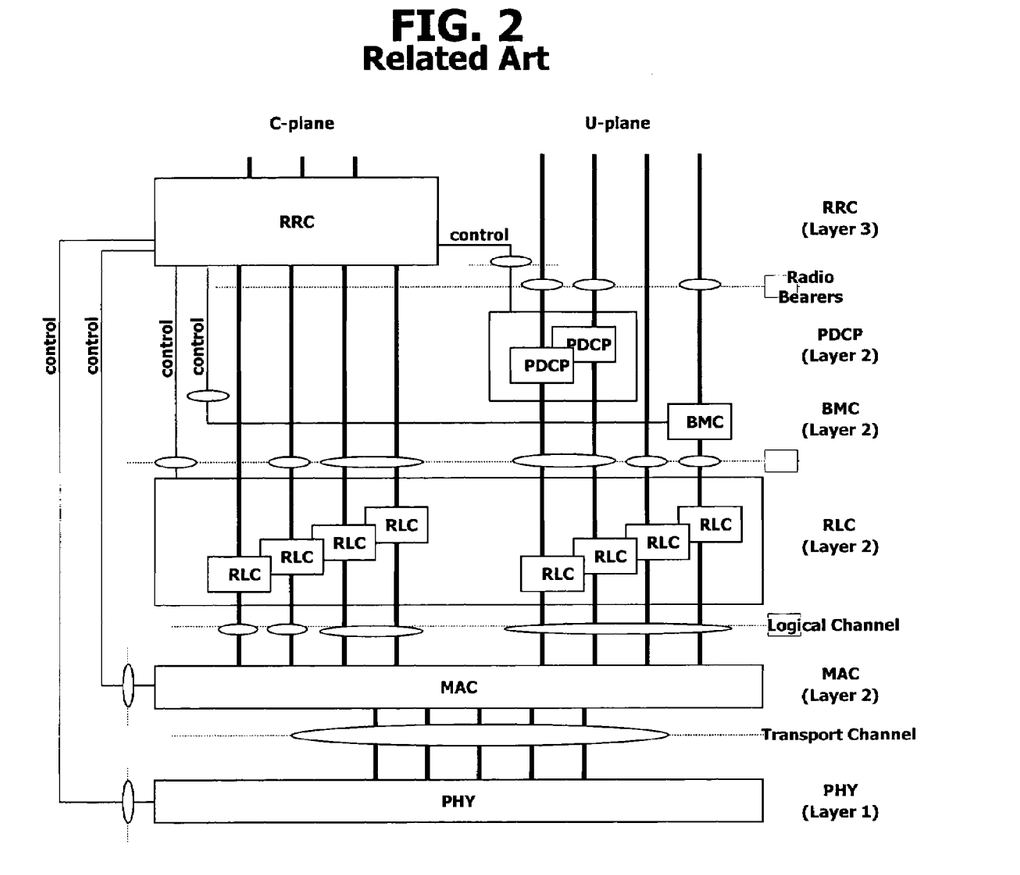
FIG. 2 illustrates an exemplary basic structure of a general UMTS network.

FIG. 2 illustrates a structure of a radio interface protocol between the terminal 10 and the UTRAN 20 according to the 3GPP radio access network standards. As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system interconnection (OSI) standard model.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels and provides allocation of the MAC parameters for allocation and re-allocation of radio resources. The MAC layer is connected to an upper layer called the radio link control (RLC) layer, via a logical channel.

Various logical channels are provided according to the type of information transmitted. In general, a control channel is used to transmit information of the control plane and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH). The BCCH provides information including information utilized by a terminal 10 to access a system. The PCCH is used by the UTRAN 20 to access a terminal 10.

The MAC layer is connected to the physical layer by transport channels and can be divided into a MAC-b sub-layer, a MAC-d sub-layer, a MAC-c/sh sub-layer, and a MAC-hs sub-layer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals. The MAC-d sub-layer manages a dedicated channel (DCH), which is a dedicated transport channel for a specific terminal 10. Accordingly, the MAC-d sublayer is located in a serving RNC (SRNC) that manages a corresponding terminal, and one MAC-d sublayer also exists in each terminal.

The RLC layer supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals 10 positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal 10 and the UTRAN 20. In general, the set up of the RB refers to the process of stipulating the characteristics of a protocol layer and a channel required for providing a specific data service, and setting the respective detailed parameters and operation methods.

The RRC state refers to whether there exists a logical connection between the RRC of the terminal 10 and the RRC of the UTRAN 20. If there is a connection, the terminal 10 is said to be in RRC connected state. If there is no connection, the terminal 10 is said to be in idle state.

For terminals 10 in RRC connected state, because an RRC connection exists the UTRAN 20 can determine the existence of a particular terminal within the unit of cells, for example which cell the RRC connected state terminal is in. Thus, the terminal 10 can be effectively controlled.

In contrast, the UTRAN 20 cannot determine a terminal 10 in idle state. Such idle state terminals 10 can only be determined by the core network 30 to be within a region that is larger than a cell, namely, a location or a routing area. Therefore, the existence of idle state terminals 10 is determined within large regions, and, in order to receive mobile communication services such as voice or data, the idle state terminal must move or change into the RRC connected state.

When initially turned on by the user, a terminal 10 searches for an appropriate cell and then remains in idle state within the corresponding cell. When the idle state terminal 10 requires RRC connection, it transitions to the RRC connected state through an RRC connection procedure so that an RRC connection is made with the RRC layer of the UTRAN 20.

There are many situations where an idle state terminal 10 needs to establish an RRC connection. When uplink data transmission is necessary, for example when the user attempts to make a call, or when transmitting a response message in reply to a paging message received from the UTRAN 20, an idle state terminal 10 must establish an RRC connection. Another situation where an idle terminal 10 needs to establish an RRC connection is in order to receive a multimedia broadcast multicast service (MBMS).

The 3GPP system can provide multimedia broadcast multicast service (MBMS), which is a new type of service in Release 6. The 3GPP TSG SA (Service and System Aspect) defines various network elements and their functions required for supporting MBMS services. A cell broadcast service provided by the conventional Release 99 is limited to a service in which text type short messages are broadcast to a certain area. The MBMS service provided by Release 6 is a more advanced service that multicasts multimedia data to terminals (UEs) 10 that have subscribed to the corresponding service in addition to broadcasting multimedia data.

The MBMS service is a downward-dedicated service that provides a streaming or background service to a plurality of terminals 10 by using a common or dedicated downward channel. The MBMS service is divided into a broadcast mode and a multicast mode.

The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

Users who desire to receive the MBMS service first receive a service announcement provided by a network. The service announcement provides the terminal 10 with a list of services to be provided and related information. In addition, the users must receive a service notification provided by the network. The service notification provides the terminal 10 with information related to the broadcast data to be transmitted.

If the user intends to receive the multicast mode MBMS service, the user subscribes to a multicast subscription group. A multicast subscription group is a group of users who have completed a subscription procedure. Once a user has subscribed to the multicast subscription group, the user can join a multicast group to receive a specific multicast service. A multicast group is a group of users that receive a specific multicast service. Joining a multicast group, also referred to as MBMS multicast activation, means merging with the multicast group that has users who wish to receive the specific multicast service. Accordingly, the user can receive the specific multicast data by joining a multicast group, referred to as MBMS multicast activation.

The RNC 23 transfers the MBMS user data to the terminal 10 through the base station (Node-B) 21 via the user plane of the UTRAN protocol. The UTRAN 20 transfers the MBMS user data by constructing and maintaining a radio access bearer (RAB) for a call communication between the terminal 10 and the core network 30. The MBMS user data is transferred only by downlink. The MBMS radio bearer facilitates transferring, only to a specific terminal 10, the user data of a specific MBMS service transferred by the core network 30 to the UTRAN 20.

The MBMS radio bearer is divided into a point-to-multipoint type and a point-to-point type. The UTRAN 20 selects one of the two types of MBMS radio bearers to provide the MBMS service. To select one of the two MBMS radio bearers, the UTRAN 20 should recognize the number of users, or terminals 10, of a specific MBMS service existing in one cell.

The UTRAN 20 may count the number of terminals 10 to determine the type of MBMS radio bearer. The UTRAN 20 informs the terminals 10 that it is counting the number of terminals when it provides information about the MBMS service via a MBMS common control channel or performs paging for a specific MBMS service group.

When a terminal 10 receives a service notification of an MBMS service indicating that counting is being performed on the corresponding service, the terminal establishes a connection between an RRC entity of the terminal and an RRC entity of the UTRAN 20 by transferring an RRC connection request message to the UTRAN through an uplink common channel. The RRC connection request message informs the UTRAN 20 that the terminal 10 desires to receive the corresponding MBMS service.

By counting the number of terminals 10 that have transferred an RRC connection request message, the UTRAN 20 can recognize users who desire to receive the specific MBMS service in one cell. The UTRAN 20 then sets up an MBMS radio bearer on the basis of the count.

If the number of users, or terminals 10, existing in a corresponding cell is smaller than a certain threshold value, the UTRAN 20 sets a point-to-point MBMS radio bearer. If the number of users, or terminals 10, existing in a corresponding cell is greater than or equal to a certain threshold value, the UTRAN sets a point-to-multipoint MBMS radio bearer. However, the conventional paging method through which the UTRAN 20 recognizes the number of terminals 10 that desire to receive an MBMS service has shortcomings.

When the UTRAN 20 performs the MBMS service notification, response messages, such as RRC response messages, are transmitted from terminals 10 that desire to receive the MBMS service. The response messages are simultaneously concentrated at uplink channel, resulting in an increase in interference and load on the uplink. Because the UTRAN 20 performs the MBMS service notification to the plurality of terminals 10 using the MBMS common control channel and the corresponding terminals simultaneously inform the UTRAN that they want to receive the corresponding MBMS service through the uplink common channel both the interference and load on the uplink increases.

Because the interference and load increases, an undesirably long period of time may be required for the terminals 10 to send response messages. Therefore, some terminals may fail to transmit the response message by the time the UTRAN 20 should set up the MBMS radio bearer.

Once the UTRAN 20 receives a number of response messages from the terminals 10 that is above the threshold for setting up the MBMS point-to-multipoint radio bearer, the UTRAN no longer needs to receive additional response messages because all requirements for selecting the radio bearer have been met. However, in the conventional art, even if the UTRAN 20 has already received above a threshold number of response messages, the UTRAN continues to receive response messages until the MBMS radio bearer is set. Therefore, uplink radio resources are undesirably wasted.

The RRC connection procedure is generally divided into three steps; the terminal 10 transmits an kRC connection request message to the UTRAN 20, the UTRAN transmits an RRC connection setup message to the terminal, and the terminal transmits an RRC connection setup complete message to the UTRAN. These steps are illustrated in FIG. 3.

Figure 3:
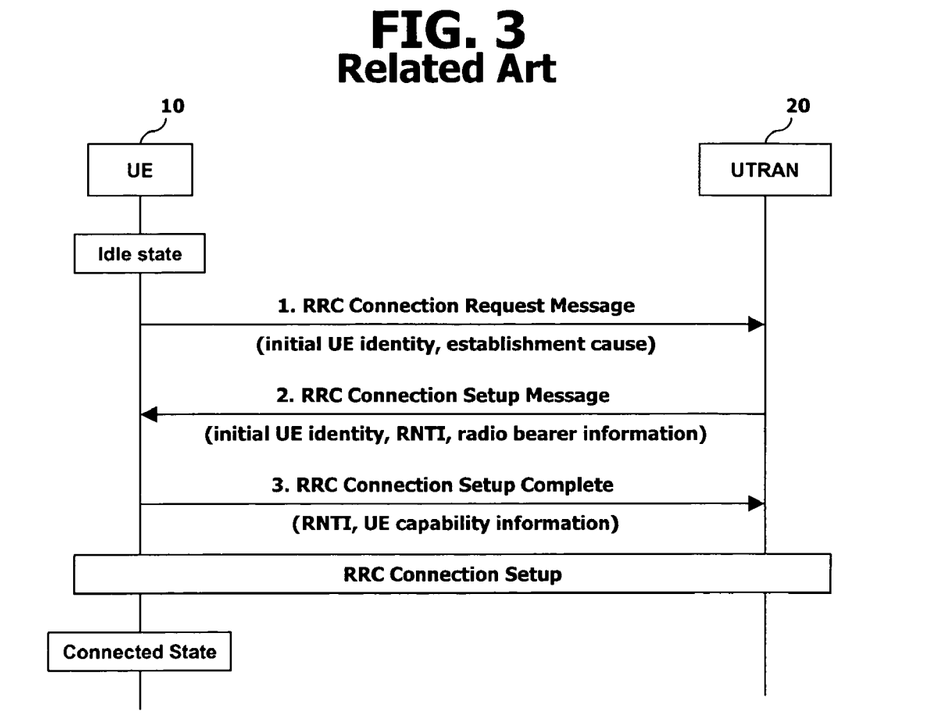
FIG. 3 illustrates the conventional art procedure when the UTRAN accepts the RRC connection request of a terminal.

FIG. 3 illustrates the conventional art procedure when the UTRAN 20 accepts the RRC connection request of the terminal 10. When an idle state terminal 10 wishes to establish an RRC connection, the terminal first transmits an RRC connection request message to the UTRAN 20. The RRC connection request message may include an RRC establishment cause and an initial terminal identifier. The initial terminal identifier, or UE identity, is an identifier that is unique to a particular terminal 10 and allows that terminal to be identified despite its location anywhere in the world.

In response to the RRC connection request, the UTRAN 20 transmits an RRC connection setup message to the terminal 10. The RRC connection setup message may include an RNTI (Radio Network Temporary Identity) and radio bearer setup information transmitted together with an initial UE identity. The RNTI is a terminal identifier allocated to allow the UTRAN 20 to identify connected state terminals 10. The RNTI is used only when an RRC connection exists and is used only within the UTRAN 20.

In response to the RRC connection setup message, the terminal 10 establishes an RRC connection with the UTRAN 20 and transmits an RRC connection setup complete message to the UTRAN 20. After the RRC connection has been established, the terminal 10 uses the RNTI instead of the initial UE identity when communicating with the UTRAN 20.

Because the initial UE identity is a unique identifier, frequent use may increase the chances of undesirable exposure. Therefore, the initial UE identity is used briefly only during the initial RRC connection procedure and the RNTI is used thereafter for security reasons.

Figure 4:
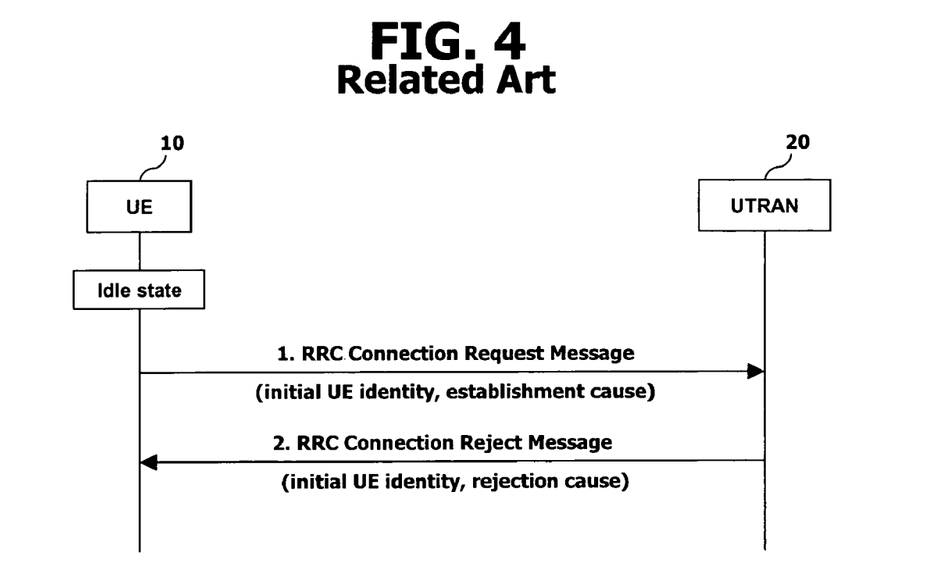
FIG. 4 illustrates the conventional art procedure when the UTRAN rejects the RRC connection request of a terminal.

However, the UTRAN 20 may also reject the RRC connection request for a variety of reasons, for example insufficient radio resources. FIG. 4 illustrates the conventional art procedure when the UTRAN 20 rejects the RRC connection request of the terminal 10.

Upon receiving an RRC connection request from the terminal 10, the UTRAN 20 transmits an RRC connection reject message if it is necessary to reject the RRC connection. An initial UE identity and rejection cause are included in the RRC connection reject message to inform the terminal 10 why the RRC connection was rejected. Upon receiving the RRC connection reject message, the terminal 10 returns to an idle state.

Figure 5:
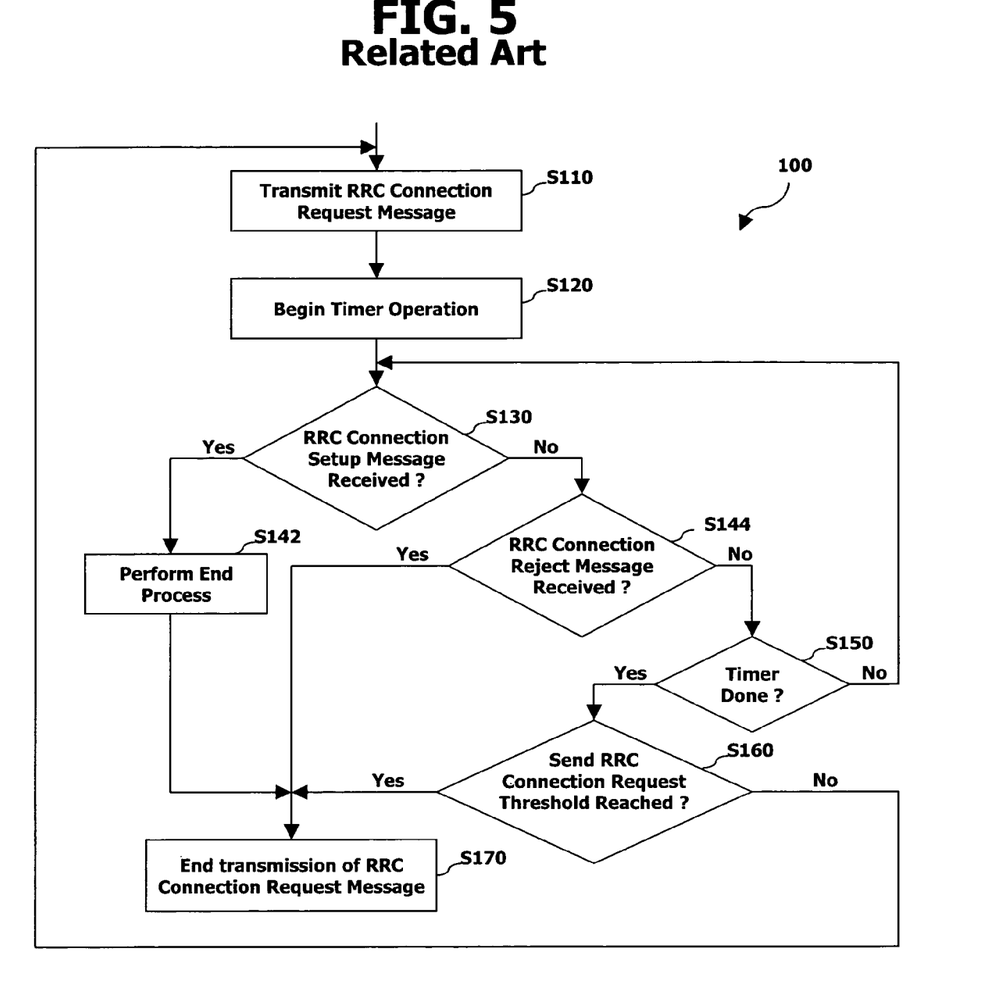
FIG. 5 illustrates a conventional art method for processing RRC connection setup messages and RRC connection reject messages.

FIG. 5 illustrates a conventional art method 100 for a terminal 10 requesting an RRC connection. The method 100 includes transmitting an RRC connection request message (S110) and operating a timer (S120), determining whether an RRC connection setup message (S130) or an RRC connection reject message (S144) is received before the timer expires (S150), and repeating the process unless an RRC connection setup message or an RRC connection reject message was received or it is determined that a threshold for sending RRC connection requests has been reached (S160).

Upon receiving an RRC connection request message from the terminal 10, the UTRAN 20 grants the RRC connection request if radio resources are sufficient and transmits an RRC connection setup message to the terminal. Otherwise the UTRAN rejects the RRC connection request and transmits an RRC connection reject message to the terminal 10.

Upon determining that an RRC connection setup message was received in step S130, the initial UE identity included in the RRC connection setup message is compared to the terminal's own identity to determine whether the message was intended for that terminal 10. If the initial UE identity included in the RRC connection setup message is different than that of the terminal 10, the terminal discards the received message and determines whether an RRC connection reject message was received in step S144. If the initial UE identity included in the RRC connection setup message matches that of the terminal 10, the terminal establishes an RRC connection with the UTRAN 20 and transitions to the RRC connected state.

Upon establishing an RRC connection with the UTRAN 20, the RNTI allocated by the UTRAN 20 is stored and an RRC connection setup complete message is transmitted to the UTRAN 20 in step S142. The RRC connection setup complete message includes capability information of the terminal 10. Transmission of additional RRC connection request messages is terminated in step S170.

Upon determining that an RRC connection reject message was received in step S144, the initial UE identity included in the RRC connection reject message is compared to the terminal's own identity to determine whether the message was intended for that terminal 10. If the initial UE identity included in the RRC connection reject message is different than that of the terminal 10, the terminal discards the received message and the state of the timer is checked in step S150. If the initial UE identity included in the RRC connection reject message matches that of the terminal 10, the terminal transitions to the idle state and terminates the RRC connection attempt in step S170.

Upon determining that the timer has not expired in step S150, the terminal 10 continues to wait for reception of an RRC connection setup message or an RRC connection reject message. Upon determining that the timer has expired in step S150, it is determined in step S160 if a threshold limit for sending RRC connection request messages has been reached.

If the threshold limit for sending RRC connection request messages has been reached, the terminal 10 terminates the RRC connection attempt in step S170. If the threshold limit for sending RRC connection request messages has not been reached, another RRC connection attempt is initiated in step S110 and the process is repeated.

In the conventional art, when the UTRAN 20 needs to send RRC connection reject messages to a plurality of terminals that requested RRC connection, radio resources are wasted because transmitting RRC connection reject messages requires an undesirably long time. A prime example of such wasted radio resources occurs when providing a multicast service.

The UTRAN 20 utilizes a multicast service notification procedure to perform a counting operation to determine the total number of terminals 10 wishing to receive a particular multicast service within a particular cell. The counting operation is used to determine whether the radio bearer to provide the particular multicast service should be point-to-multipoint or point-to-point. If the number of terminals existing in the corresponding cell is less than a threshold value, a point-to-point radio bearer is set. If the number of terminals is greater than or equal to the threshold, a point-to-multipoint radio bearer is set.

When a point-to-point radio bearer is set for a particular service, the terminals 10 wishing to receive the service are all in RRC connected state. However, when a point-to-multipoint radio bearer is set for a particular service, all terminals 10 wishing to receive the service need not be in RRC connected state because RRC idle state terminals are also able to receive the multicast service through the point-to-multipoint radio bearer.

For a multicast service, selecting the radio bearer type using the counting operation is essential for effectively allocating radio resources. Therefore, the selecting operation is performed before starting a multicast service or periodically during the multicast service.

In order to count the number of terminals 10 at the UTRAN 20, those terminals in idle state transmit an RRC connection request message to the UTRAN immediately upon receiving a service notification. When the UTRAN 20 receives an RRC connection request message after service notification, the number of terminals 10 wishing to receive a particular multicast service within a cell is counted to determine the type of radio bearer. Based on the radio resource conditions, RRC connection setup messages are transmitted to a certain number of terminals 10 and RRC connection reject messages are transmitted to the remaining terminals so that some terminals can receive the corresponding service in RRC idle state.

Because multicast service is a service aimed at a large number of terminals 10, the UTRAN 20 receives RRC connection request messages from a large number of terminals almost simultaneously after service notification. The UTRAN 20 typically rejects a majority of these RRC connection requests. Since each RRC connection reject message informs only one terminal 10 that its RRC connection request has been rejected, an extended period of time and large amount of radio resources are expended to transmit RRC connection reject messages to all corresponding terminals, particularly in a multicast service in which a very large number of terminals are handled.

Additionally, if a terminal 10 that transmitted an RRC connection request message does not receive an RRC connection setup message or an RRC connection reject message within a certain period of time, the terminal transmits the RRC connection request message again. The re-transmission of RRC connection request messages wastes further radio resources since the UTRAN must receive each re-transmitted message.

Therefore, there is a need for a method and apparatus that facilitates informing a plurality of terminals that their RRC connection request was rejected without having to send an RRC connection reject message to each terminal such that radio resources are conserved. The present invention addresses this and other needs.

SUMMARY OF THE INVENTION

The present invention is directed to a to a method and apparatus for facilitating connection between a terminal and a network in a UMTS (Universal Mobile Telecommunication System) by which a single group reject message is utilized by the network to inform a plurality of terminals that their connection request was rejected.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication system and device that facilitates RRC connection between a terminal and UTRAN in a UMTS in a way that conserves radio resources. Specifically, a method and apparatus is provided that allows the UTRAN to inform a plurality of terminals that that their RRC connection request was rejected via a single message transmitted to a plurality of terminals. Although the invention is described herein with regard to a UMTS developed by the 3GPP, it is contemplated that the methods and apparatus of the present invention may be applied whenever it is desired to inform a plurality of terminals in a mobile communication system that their request for connection has been rejected.

In one aspect of the present invention, a method is provided for a terminal in radio communication with a network. The method includes initiating a connection process associated with a user service provided by a network by transmitting a connection request to the network, receiving a group reject message including a list identifying terminals whose connection request was rejected, and comparing a terminal identity with terminal identities in the list of the group reject message to determine if the group reject message is discarded or the connection process is abandoned.

The presence of the terminal identity in the list indicates that the connection request was rejected. The absence of the terminal identity on the list indicates that the connection request has not yet been rejected. Therefore, if the terminal identity is not in the list, the group reject message is discarded and the terminal continues to wait for another group reject message or a connection setup message indicating that the connection request was granted. If the terminal identity is on the list, the terminal abandons the connection process.

Preferably the connection requests are RRC connection requests and the communication connection sought is an RRC connection associated with an MBMS multicast service. The list may contain initial internal UE identities of the terminals subscribing to the user service whose RRC connection request is rejected and the terminal compares an internal initial UE identity to those in the list to determine if the message is intended for that particular terminal. It is contemplated that group reject message may include a rejection cause indicating why the connection request was rejected.

In another aspect of the present invention, a method is provided for a terminal in radio communication with a network. The method includes initiating a connection process associated with a user service provided by a network by transmitting a connection request to the network, receiving a connection response message including either connection setup information or group reject information, and evaluating the connection response message to determine if a network connection is established, the connection response message is discarded, or the connection process is abandoned.

If the connection response message contains connection setup information, the terminal establishes a connection with the network utilizing the connection setup information. Once the connection is complete, the terminal transmits a message to the network indicating connection complete status.

If the connection response message contains group reject information, the terminal determines if the group reject information is intended for that particular terminal based on a list in the group reject information identifying terminals whose connection request was rejected. If the list includes that particular terminal's identity, the terminal abandons the connection process since the connection request was rejected. If the list does not include that particular terminal's identity, the connection response message is discarded and the terminal continues to wait for another connection response message.

Preferably the connection requests are RRC connection requests and the communication connection sought is an RRC connection associated with an MBMS multicast service. The connection reject information may include a list containing initial internal UE identities of the terminals subscribing to the user service whose RRC connection request is rejected and the terminal compares an internal initial UE identity to those in the list to determine if the message is intended for that particular terminal. It is contemplated that the group reject message may include a rejection cause indicating why the connection request was rejected.

In another aspect of the present invention, a method is provided for a network in radio communication with a plurality of terminals. The method includes receiving connection requests from each of the plurality of terminals, determining which connection requests are granted and which connection requests are rejected, generating a list identifying those terminals that should not set up the communication connection, and transmitting a single group reject message including the list to the plurality of terminals.

Preferably the connection requests are RRC connection requests seeking an RRC connection associated with an MBMS multicast service and the determination of which terminals should set up an RRC connection is preferably performed in accordance with available radio resources and/or terminal priority. The list may contain initial internal UE identities of the terminals whose RRC connection request is rejected.

It is contemplated that group reject message may include a rejection cause indicating why the connection request was rejected. It is further contemplated that the group reject message may be transmitted by the network within a particular time period after the first connection request is received in order to prevent those terminals whose connection request is rejected from sending additional connection requests. Moreover, it is contemplated that the network may transmit a connection response message including connection setup information to at least one terminal whose connection request is granted.

In another aspect of the present invention, a method is provided for a terminal in radio communication with a network. The method includes transmitting a connection request to the network to request a connection setup message, determining if either a connection setup message or a group reject message intended for that particular terminal is received within a certain period of time, and either re-transmitting the connection request message or entering a connected state or an idle state.

If neither a connection setup message nor a group reject message is received within a predetermined period of time, the connection request is re-transmitted. If a connection setup message was received within the predetermined period of time, the terminal establishes a network connection and enters the connected state. If a group reject message intended for the terminal was received within the predetermined period of time, the terminal enters an idle state and transmits no additional connection requests.

Preferably the connection request is an RRC connection request, the communication connection sought is an RRC connection associated with an MBMS multicast service, and the connected state is an RRC connection between the terminal and network. The group reject message is preferably an RRC group reject message and the connection setup message and group reject message are preferably received on the same channel.

It is contemplated that the group reject message may contain initial internal UE identities of the terminals subscribing to the user service whose RRC connection request is rejected. The terminal compares an internal initial UE identity to those in the list to determine if the message is intended for that particular terminal.

The presence of the terminal identity in the list indicates that the group reject message is intended for that particular terminal. The absence of the terminal identity in the list indicates that the group reject message is not intended for that particular terminal. Therefore, if the terminal identity is not in the list, the group reject message is discarded and the terminal continues to wait for another group reject message indicating that the connection request was rejected or a connection setup message indicating that the connection request was granted.

If the terminal identity is in the list, the terminal enters the idle state and abandons the connection process.

In another aspect of the present invention, a method is provided for a network in radio communication with a plurality of terminals. The method includes receiving connection requests from each of the plurality of terminals, transmitting connection setup messages only to those terminals determined to set up a communication connection, and transmitting to all the terminals a connection reject message containing reject information for those terminals that should not set up the communication connection, with the connection setup messages and the connection reject message transmitted over the same channel.

Preferably the connection requests are RRC connection requests seeking an RRC connection between a terminal and the network associated with an MBMS multicast service. The connection requests are preferably transmitted over an MBMS control channel.

The connection setup messages are preferably RRC connection setup messages. The connection reject message is preferably an RRC group reject message containing a list of initial internal UE identities of the terminals whose RRC connection request is rejected. The connection setup messages and reject message are preferably transmitted over a common control channel.

In another aspect of the present invention, a terminal is provided for radio communication with a network. The terminal includes a transmitter, a display, a memory unit, a receiver and a processing unit.

The transmitter initiates a network connection process associated with a user service by transmitting a connection request to the network. The display conveys information to a user. The memory unit stores information related to the network connection and user service. The receiver receives connection response messages from the network containing connection setup information and connection reject information. The processing unit performs the methods of the present invention to evaluate the contents of connection response messages in order to either establish a network connection, discard the connection response message if it is not intended for the particular terminal, or abandon the network connection process if the connection response indicates that the connection request was rejected.

In another aspect of the present invention, a network is provided for radio communication with a plurality of terminals. The terminal includes a receiver, a transmitter, a storage unit, and a processing unit.

The receiver receives connection requests seeking a network connection associated with a user service from the plurality of terminals. The transmitter transmits connection response messages containing connection setup information or connection reject information to the plurality of terminals. The storage unit stores information related to the network connection and user service. The processing unit performs the methods of the present invention to determine which of the plurality of terminals should setup a communication connection, generate a list identifying the terminals for which a connection request is not granted, send a connection response message containing connection setup information to those terminals determined to receive a communication connection, and send a group reject connection response message containing the list to the plurality of terminals.

In another aspect of the present invention, a method of radio communication between a plurality of terminals and a network is provided. The method includes receiving connection requests from the plurality of terminals at the network, determining which terminals should set up a communication connection, generating a list to identify those terminals that should not set up the communication connection, transmitting a single group reject message including the list to the plurality of terminals, and receiving the group reject message at each of the plurality of terminals, with those terminals that are identified by the list entering an idle state in which no more connection requests are transmitted to the network.

Preferably the connection requests are RRC connection requests and the communication connection sought by the terminals is an RRC connection associated with an MBMS multicast service. The determination of which terminals should set up an RRC connection is preferably performed in accordance with available radio resources and/or terminal priority. The list may contain initial internal UE identities of the terminals whose connection request is rejected and the terminals compare their internal initial UE identity to those in the list to determine if they are to enter the idle state.

It is contemplated that group reject message may include a rejection cause to inform the terminals why their connection request was rejected. It is further contemplated that the group reject message may be transmitted by the network within a particular time period after the first connection request is received in order to prevent those terminals whose connection request is rejected from sending additional connection requests.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method and apparatus for facilitating connection between a terminal and a network in a UMTS (Universal Mobile Telecommunication System) by which a single group reject message is utilized by the network to inform a plurality of terminals that their connection request was rejected. Although the present invention is illustrated with respect to a mobile communication system such as a UMTS developed by the 3GPP, and specifically an RRC connection associated with an MBMS user service, it is contemplated that the methods and apparatus described herein may also be applied to a communication system operating under similar and/or different standards when it is desired to inform a plurality of terminals that their connection request was rejected without having to send a connection reject message to each terminal such that radio resources are conserved.

The present invention allows a UTRAN 520 to send the same RRC connection reject message to a plurality of terminals 400 having the same RRC connection reject cause by transmitting a single RRC group reject message containing an initial UE identity list with a plurality of initial UE identities and, optionally, including the RRC connection reject cause. A terminal 400 receiving the RRC group reject message first checks to see if its initial UE identity matches any of those in the initial UE identity list. If there is a match, the terminal 400 stops transmitting an RRC connection request and enters an idle state. If there is no match, the terminal 400 continues to wait for an RRC connection setup message or an RRC connection reject message from the UTRAN 520.

Figure 6:
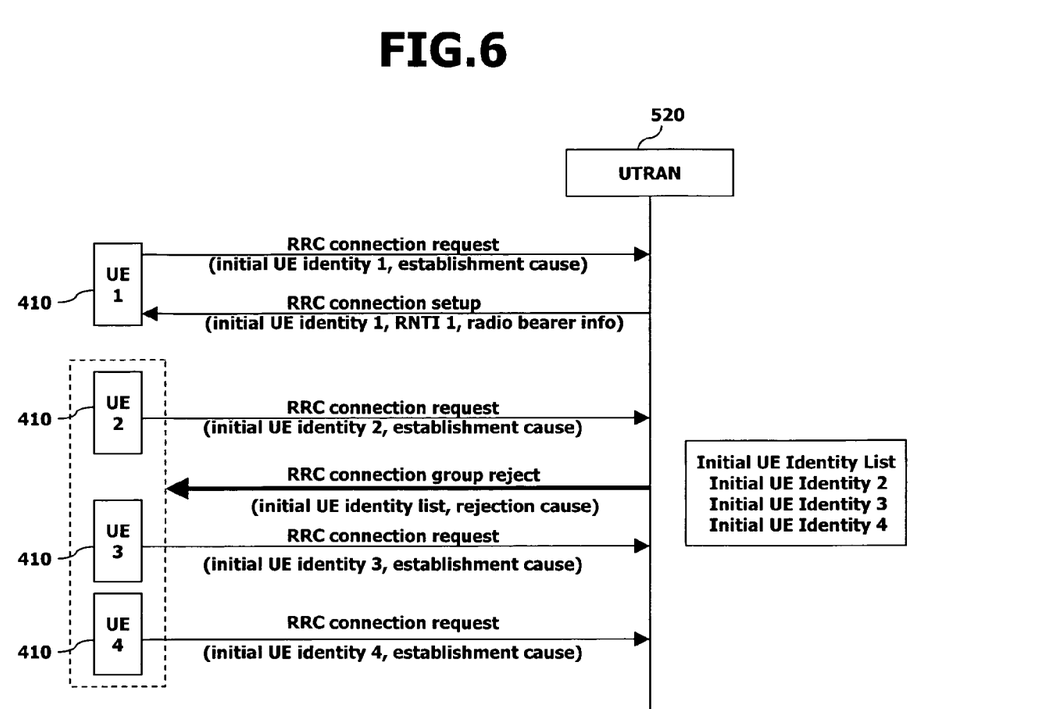
FIG. 6 illustrates the procedure when the UTRAN accepts the RRC connection request of a terminal and rejects the RRC connection requests of a plurality of terminals according to the methods of the present invention.

FIG. 6 illustrates the procedure for transmitting an RRC group reject message utilizing the methods and apparatus of the present invention. Assuming that the UTRAN 520 receives the same RRC connection request message from each of the terminals 400 illustrated (UE1 through UE4), the UTRAN then determines whether to accept or reject each connection request. The condition of radio resources and terminal priority may be considered, among other factors, in making this determination. FIG. 6 illustrates an example where the request from UE 1 is accepted, while the requests from UE2 through UE4 are rejected.

The UTRAN 520 transmits an RRC connection setup message containing an initial UE identity 1, an RNTI 1, and radio bearer information to UE 1, which has its RRC connection request accepted. Because each terminal 400 is allocated a different RNTI and radio bearer information, an RRC connection setup message must be transmitted to each terminal for which RRC connection is allowed. Therefore, if there are more terminals 400 whose connection request is granted, the UTRAN 520 must transmit additional connection setup messages.

Simultaneous with the transmission of the RRC connection setup message to UE 1, the UTRAN 520 also transmits an RRC group reject message for UE 2 through UE 4, terminals 400 for which RRC connection has been rejected. An initial UE identity list for the terminals 400 is included in the RRC group reject message to allow the terminals to determine if the message is intended for that particular terminal.

Since the UTRAN 520 must reject the RRC connection requests from a plurality of terminals 400, it is preferable that the RRC group reject message be transmitted to only those terminals having the same reason for rejection, or rejection cause. Furthermore, the UTRAN 520 transmits the RRC group reject message after gathering the requests received from a plurality of terminals 400 over a relatively long period of time, terminals that transmitted their connection requests much earlier than other terminals may have already re-transmitted connection requests because they had not received any response from the UTRAN. This unnecessary re-transmission of requests wastes radio resources. To further conserve radio resources, the UTRAN 520 preferably transmits the RRC group reject message to those terminals 400 that transmitted their requests within a relatively short time period of time. Therefore, the UTRAN 520 generates an RRC group reject message for those terminals that have the same rejection cause and that requested RRC connection simultaneously or within a certain time period.

In FIG. 6, UE 2 through UE 4 receive the RRC group reject message and first check the initial UE identity list to see if their identity is included on the list. If a terminal 400 finds its identity on the list, the terminal stops its RRC connection request procedure and enters an idle state. If a terminal 400 does not find its identity on the list, the terminal discards the received RRC group reject message and continues to wait for an RRC connection setup message or another RRC group reject message.

Figure 7:
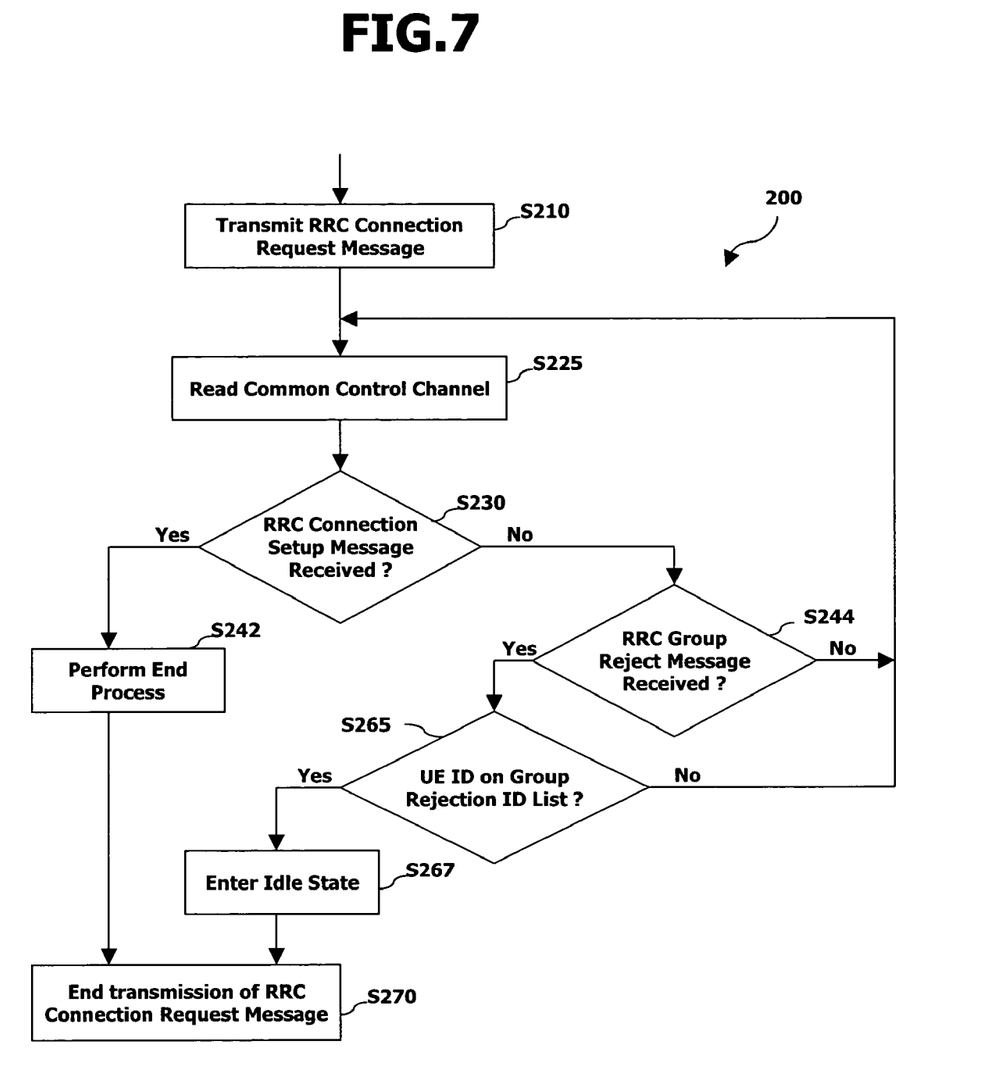
FIG. 7 illustrates a method for processing RRC connection setup messages and RRC group reject messages according to one embodiment of the present invention.

FIG. 7 illustrates a method 200 for processing RRC connection setup messages and an RRC group reject message in a terminal 400 according to one embodiment of the present invention. The method 200 includes initiating a network connection process by transmitting an RRC connection request message (S210) and then reading a common control channel (S225) until either an RRC connection setup message is received (S230) or an RRC group reject message is received (S244). It is contemplated that the method 200 may incorporate methods in the related art, such as timers and re-transmission thresholds, to re-transmit the RRC connection request message if an RRC connection setup message or RRC group reject message is not received.

If an RRC connection setup message was received in step S230, a connection to the network is established in step S242 and an RRC connection setup complete message is transmitted to the network. Further re-transmission of RRC connection request messages is ceased in step S270.

If an RRC connection setup message is not received, it is determined in step S244 if an RRC group reject message was received. If an RRC group reject message was not received, the terminal 400 continues to wait for an RRC connection setup message or RRC group reject message by again reading the common control channel in step S225. If an RRC group reject message was received, a list of UE identities contained in the RRC group reject message is checked. The UE identities indicate the terminals 400 whose connection requests were rejected.

If step S265, an internal terminal identifier is compared to the list of UE identifiers in the RRC group reject message. If the particular terminal's internal terminal identifier is found in the list, the terminal 400 enters an idle state in step S267 and the network connection process is abandoned, with further retransmission of RRC connection request messages ceased in step S270. If the particular terminal's internal terminal identifier is not found in the list, the RRC group reject message is discarded and the terminal 400 continues to wait for an RRC connection setup message or RRC group reject message by again reading the common control channel in step S225.

The RRC connection request may be associated with a user service, such as MBMS multipoint service, and the RRC connection setup messages and RRC group reject message may be directed to terminals 400 subscribing to the service. Preferably, the RRC connection setup messages and RRC group reject message are received on the same common control channel and the RRC connection request messages are transmitted on an MBMS control channel.

Figure 8:
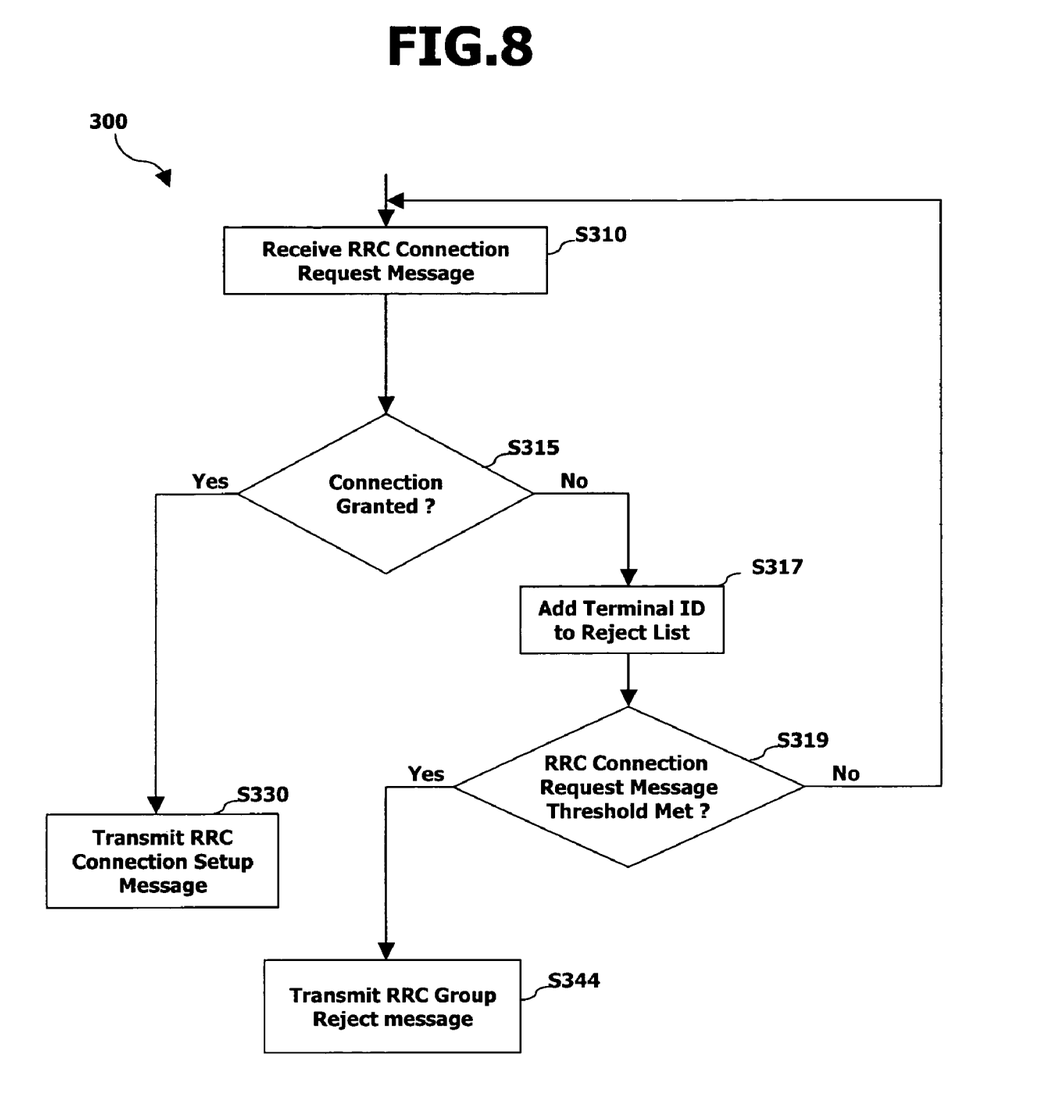
FIG. 8 illustrates a method for transmitting an RRC connection setup message and an RRC group reject message according to one embodiment of the present invention.

FIG. 8 illustrates a method 300 for processing RRC connection request messages and generating RRC connection setup messages and an RRC group reject message in a network according to one embodiment of the present invention. The method 300 includes receiving an RRC connection request message (S310) and then determining whether or not to grant the RRC connection request (S315).

The determination in step S315 of whether or not to grant the RRC connection request may be in accordance with available radio resources and/or terminal priority. If the RRC connection request is granted, an RRC connection setup message is transmitted in step S330 to the terminal 400 that transmitted the RRC connection request. If the RRC connection request is rejected, a terminal identifier corresponding to the terminal 400 that transmitted the RRC connection request is added, in step S317, to a list of terminal identifiers corresponding to terminals whose RRC connection request was rejected.

In a preferred embodiment, a threshold is utilized in step S319 to determine when to transmit an RRC group reject message. It is contemplated that the threshold is related to a predetermined time period such that the RRC group reject message is transmitted within the predetermined period of time after the first RRC connection request is received in order to prevent terminals 400 from retransmitting an RRC connection request before they are informed that their previous RRC connection request was rejected.

An RRC group reject message containing the list of terminal identifiers is transmitted in step S344. It is contemplated that the RRC group reject message may include a rejection cause indicating why the connection request was rejected. Preferably the list of terminal identifiers in the RRC group reject message corresponds to terminals 400 having the same rejection cause.

RRC connection setup messages are transmitted only to those terminals 400 determined to set up a communication connection, while the RRC group reject message is transmitted to all terminals. Preferably, the RRC connection setup messages and the RRC group reject message are transmitted over the same common control channel.

It should be noted that the order of the steps of the methods illustrated in FIGS. 7 and 8 are only exemplary and may be changed without departing from the intent of the present invention. Furthermore the methods illustrated in FIGS. 7 and 8 may performed by the appropriate software and/or hardware in the UTRAN 520 and in each terminal 400.

Figure 9:
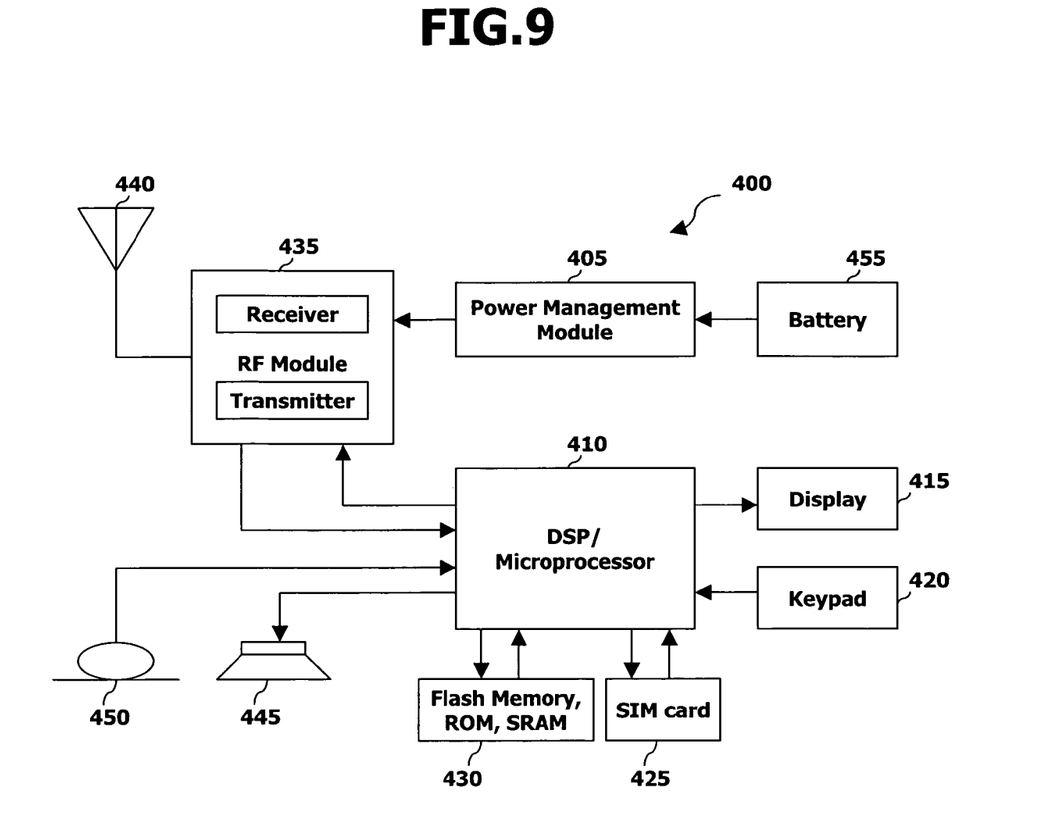
FIG. 9 illustrates a terminal for processing RRC connection setup messages and RRC group reject messages according to one embodiment of the present invention.

FIG. 9 illustrates a block diagram of a terminal 400 according to the preferred embodiment of the present invention. The terminal 400 comprises a processor or digital signal processor 412, RF module 435, power management module 405, antenna 440, battery 455, display 415, keypad 420, memory 430, SIM card 425 (which may be optional), speaker 445 and microphone 450.

A user enters instructional information, such as a telephone number, for example, by pushing the buttons of a keypad 420 or by voice activation using the microphone 450. The processor 412 receives and processes the instructional information to perform the appropriate function, such as to dial the telephone number. Operational data may be retrieved from the Subscriber Identity Module (SIM) card 425 or the memory module 430 to perform the function. Furthermore, the processor 412 may display the instructional and operational information on the display 415 for the user's reference and convenience. Moreover, the processor 412 is adapted to perform the method 200 illustrated in FIG. 7.

The processor 412 issues instructional information to the RF module 435, to initiate communication, for example, transmit radio signals comprising voice communication data or transmit an RRC connection request message as described herein. The RF module 435 comprises a receiver and a transmitter to receive and transmit radio signals. An antenna 440 facilitates the transmission and reception of radio signals. Upon receiving radio signals such as an RRC connection setup message or RRC group reject message from the network as described herein, the RF module 435 may forward and convert the signals to baseband frequency for processing by the processor 412. The processed signals may also be transformed into audible or readable information outputted via the speaker 445, for example if the radio signals are an incoming phone call.

Figure 10:
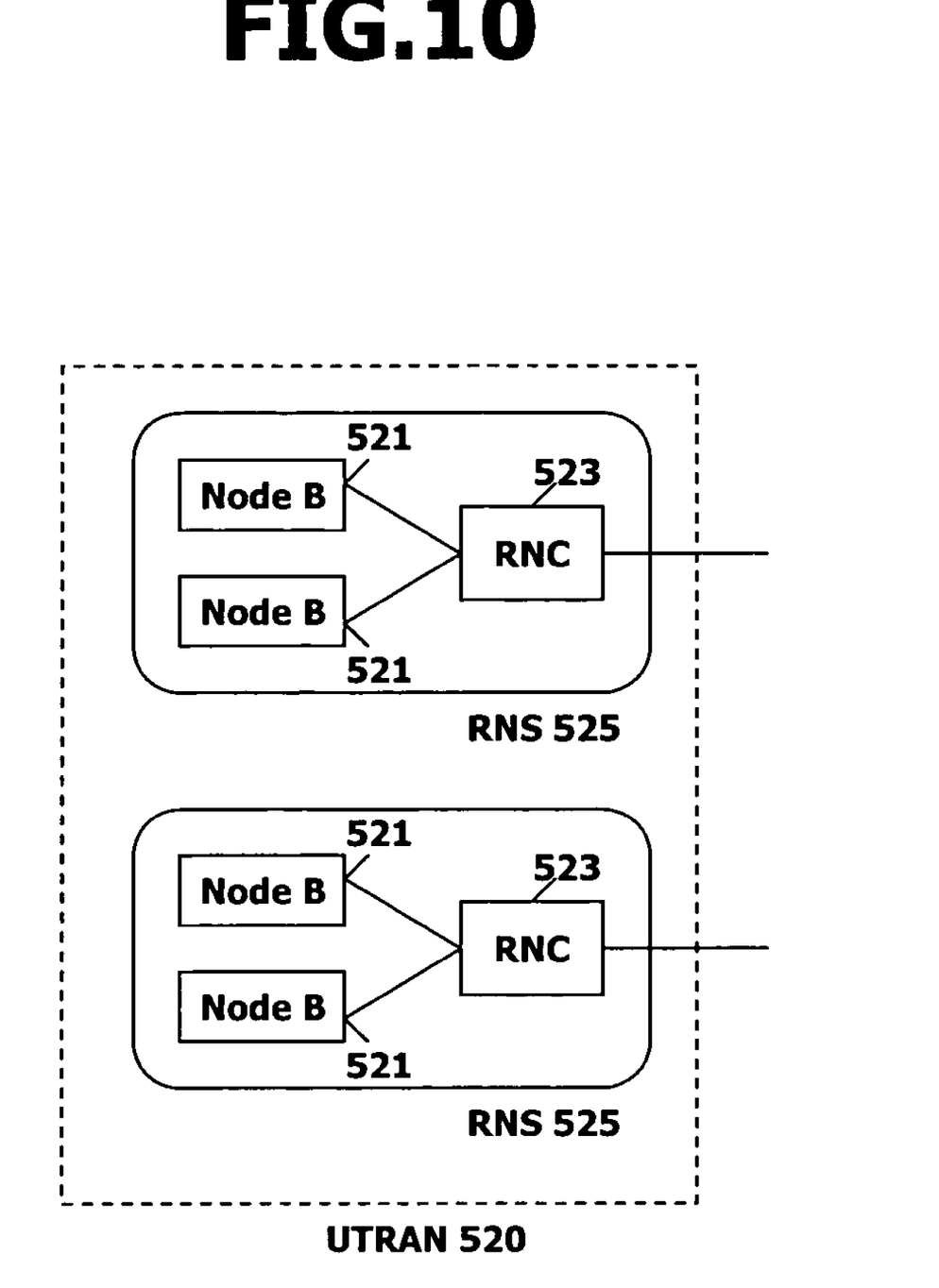
FIG. 10 illustrates a network for transmitting RRC connection setup messages and RRC group reject messages according to one embodiment of the present invention.

FIG. 10 illustrates a block diagram of a UTRAN 520 according to the preferred embodiment of the present invention. The UTRAN 520 includes one or more radio network sub-systems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to the core network 30. Furthermore, the RNC 523 is adapted to perform the method 300 illustrated in FIG. 8.

The Node-Bs 521 receive information sent by the physical layer of the terminal 400 through an uplink, and transmit data to the terminal through a downlink. The Node-Bs 521 operate as access points, or as a transmitter and receiver, of the UTRAN 520 for the terminal 400.

In the related art, when the UTRAN 20 rejects the RRC connection requests transmitted from certain terminals 10, a reject message must be transmitted to each terminal whose RRC connection request is rejected. An undesirably long time is required to transmit multiple reject messages, which wastes downlink radio resources. Uplink radio resource may be wasted as well because some terminals 10 may re-transmit their RRC connection requests if they do not receive any response from the UTRAN 20 within an allowed time.

The present invention facilitates transmitting a single RRC group reject message for rejecting the RRC connection requests of a plurality of terminals 400, thereby minimizing waste of radio resources and providing a quick response to those terminals that transmitted a request. It can be understood that the present invention would be especially advantageous when providing a multicast service to a large number of terminals 400.

It will be apparent to one skilled in the art that the preferred embodiments of the present invention can be readily implemented using, for example, the processor 412 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of communicating with a network in a wireless communication system, the method comprising:
    transmitting a connection request message to the network;
    receiving, from the network, a group reject message in response to the transmitted connection request message, the group reject message including a terminal identity list with a plurality of terminal identifiers; and
    checking whether any of the plurality of terminal identifiers of the terminal identity list matches an internal terminal identifier,
    wherein the connection request message is a Radio Resource Control (RRC) connection request message,
    wherein the group reject message is an RRC group reject message that further includes an RRC connection reject cause,
    wherein the RRC connection reject cause is the same for all terminals corresponding to the terminal identifiers of the terminal identity list in the group reject message, and
    wherein the group reject message is transmitted within a predetermined period of time after transmitting the connection request message.

2. The method of claim 1 further comprising terminating the transmission of the connection request message to the network and entering into an idle state if any of the plurality of terminal identifiers of the terminal identity list matches the internal terminal identifier.

3. The method of claim 1 further comprising waiting for one of a connection setup message and another group reject message from the network if any of the plurality of terminal identifiers of the terminal identity list does not match the internal terminal identifier.

4. The method of claim 1, wherein the connection request message is transmitted to the network for initiating a network connection process associated with a user service.

5. The method of claim 4, wherein the user service includes a MBMS service.

6. The method of claim 1, wherein the plurality of terminal identifiers identify terminals for which a connection request is rejected by the network.

7. A method of communicating with a plurality of terminals in a wireless communication system, the method comprising:
    receiving one or more connection request messages from the plurality of terminals; and
    transmitting a group reject message to the plurality of terminals in response to the received one or more connection request messages, the group reject message including a terminal identity list with a plurality of terminal identifiers,
    wherein the one or more connection request messages are Radio Resource Control (RRC) connection request messages,
    wherein the group reject message is an RRC group reject message that further includes an RRC connection reject cause,
    wherein the RRC connection reject cause is the same for all terminals corresponding to the terminal identifiers of the terminal identity list in the group reject message, and
    wherein the group reject message is transmitted within a predetermined period of time after receiving the one or more connection request messages.

8. The method of claim 7, further comprising:
    determining which of the one or more received connection requests are granted and which of the one or more received connection requests are rejected.

9. The method of claim 8, wherein the plurality of terminal identifiers of the terminal identity list indicate a corresponding terminal whose connection request is rejected.

10. The method of claim 8, wherein the determination of which of the one or more received connection requests are granted and which of the one or more received connection requests are rejected is in accordance with at least one of available radio resources and a priority of each terminal.

11. The method of claim 7, wherein the one or more connection request messages are for initiating a network connection process associated with a user service.

12. The method of claim 11, wherein the user service includes a point to multipoint service.

13. The method of claim 7, wherein the plurality of terminal identifiers identify terminals for which a connection request is rejected by the network.

* * * * *